(12) United States Patent
Miles et al.

(10) Patent No.: US 9,817,147 B2
(45) Date of Patent: Nov. 14, 2017

(54) AIRBORNE ELECTROMAGNETIC SYSTEM WITH LARGE SUSPENSION COIL ASSEMBLY

(71) Applicant: CGG DATA SERVICES AG, Zug (CH)

(72) Inventors: Philip John Miles, Oakville (CA); William Wallace Marr, Ridgeway (CA)

(73) Assignee: CGG DATA SERVICES AG, Zug (CH)

( * ) Notice: Subject to any disclaimer, the term of this patent is extended or adjusted under 35 U.S.C. 154(b) by 177 days.

(21) Appl. No.: 14/421,502

(22) PCT Filed: Aug. 19, 2013

(86) PCT No.: PCT/CA2013/000724
§ 371 (c)(1),
(2) Date: Feb. 13, 2015

(87) PCT Pub. No.: WO2014/026275
PCT Pub. Date: Feb. 20, 2014

(65) Prior Publication Data
US 2015/0369944 A1  Dec. 24, 2015

Related U.S. Application Data

(60) Provisional application No. 61/684,404, filed on Aug. 17, 2012.

(51) Int. Cl.
*G01V 3/16* (2006.01)
*G01V 3/165* (2006.01)

(52) U.S. Cl.
CPC ............... *G01V 3/165* (2013.01); *G01V 3/16* (2013.01)

(58) Field of Classification Search
CPC . G01V 3/08; G01V 3/10; G01V 3/101; G01V 3/102; G01V 3/104; G01V 3/105;
(Continued)

(56) References Cited

U.S. PATENT DOCUMENTS

| RE42,217 E | 3/2011 | Morrison et al. |
|---|---|---|
| 2003/0094952 A1 | 5/2003 | Morrison et al. |

(Continued)

FOREIGN PATENT DOCUMENTS

| CA | 2650183 A | 7/2010 |
|---|---|---|
| WO | 2009/135296 A1 | 11/2009 |
| WO | 2010/105337 A1 | 9/2010 |

OTHER PUBLICATIONS

International Search Report in related International Application No. PCT/CA2013/000724, mailed Oct. 28, 2013.
(Continued)

*Primary Examiner* — David M. Schindler
(74) *Attorney, Agent, or Firm* — Patent Portfolio Builders PLLC

(57) ABSTRACT

The present invention provides an airborne electromagnetic receiver having a large dimension to allow low transmitter base frequency. A modular and configurable suspension assembly is provided for use within a receiver support structure and suspending the support structure. The suspension assembly has a rigid support having a suspension portion, and links connecting the suspension portion and the suspended structure. The links are adjustable in length and tension to radially suspend said equipment support structure. The natural frequency of the suspension assembly and the suspended receiver motion can be optimized by adjusting mass distribution, suspension link length and suspension link tension. The suspension assembly can be used to suspend a receiver having large receiver coils. The suspension assembly converts high frequency vibration forces (Continued)

imparted on the receiver to a low frequency oscillation. The suspension assembly may also be tuned to avoid coincidence with the excitation frequencies.

18 Claims, 9 Drawing Sheets

(58) Field of Classification Search
CPC . G01V 3/108; G01V 3/15; G01V 3/16; G01V 3/165
See application file for complete search history.

(56) References Cited

U.S. PATENT DOCUMENTS

| | | |
|---|---|---|
| 2003/0169045 A1 | 9/2003 | Whitton |
| 2011/0050230 A1* | 3/2011 | Kuzmin ................. G01V 3/165 324/330 |
| 2011/0115489 A1* | 5/2011 | Morrison ................. B64D 3/00 324/330 |
| 2011/0175604 A1* | 7/2011 | Polzer ................. G01R 33/022 324/246 |

OTHER PUBLICATIONS

Patent Examination Report in corresponding Australian Application No. 2013302262 dated Oct. 26, 2016. (Reference D1 was submitted with an Information Disclosure Statement on Feb. 13, 2015.).

\* cited by examiner

AIRBORNE ELECTROMAGNETIC SYSTEM WITH LARGE SUSPENSION COIL ASSEMBLY

FIELD OF THE INVENTION

The present invention generally relates to airborne electromagnetic (EM) surveying systems and methods, and more specifically to airborne EM systems having towed receiver coil assemblies for measuring electromagnetic fields.

BACKGROUND OF THE INVENTION

An airborne EM survey system generally includes a transmitter for generating a primary electromagnetic field that induces eddy currents in the earth. These eddy currents generate a secondary electromagnetic field or ground response. A receiver of the EM system then measures the response of the ground. The currents induced in the ground are a function of conductivity. By processing and interpreting the received signals, it is possible to study and estimate the distribution of conductivity in the subsurface.

EM measurements can be made in either frequency domain or time domain. In a frequency domain EM system, the transmitter generates a sinusoidal electromagnetic field at one or more frequencies. The amplitude and phase of the secondary field relative to the primary field are indicative of the subsurface conductivity. In a time domain EM system, transient pulses are applied to the transmitter during an ON-period to generate a primary electromagnetic field that induces a decaying secondary electromagnetic field. The receiver measures the amplitude and decay characteristics of the secondary field during an OFF-period of the pulses.

An airborne EM system's signal-to-noise ratio (SNR) is an important indication of the effective depth of exploration of the EM system and its ability to recognize and measure a potential target. Various systems and methods for improving SNR have been known in the art. For example, increasing the distance between the transmitter and receiver may reduce system noise thereby improving the SNR. In time domain systems, increasing the size of the transmitter loop may also help increasing the SNR. However, these conventional improvements are transmitter-dependent and usually result in increased size and complexity of the overall system.

Furthermore, the operation of the EM system in air may introduce other sources of noise. For example, erratic movement of the EM system receiver coil assembly in the earth's geomagnetic field may produce a signal in the receiver coils that cannot be distinguished from the induced fields (or earth response) the EM system is attempting to measure. This signal is then considered as noise and reduces the overall capability of the EM system to discriminate geological information.

International Patent Publication WO2009/135296A1 proposes a double suspension receiver coil apparatus wherein the receiver coil is elastically suspended within an inner tubular member, and the inner tubular member is elastically suspended within an outer tubular member. However, this proposed system is cumbersome to manufacture and assemble, and may not be as effective in reducing the torsional vibration, or rotational vibration, of the receiver coil frame.

Canadian Patent Application No. 2,650,183 proposes a receiver coil assembly comprising a receiver loop frame and two sets of ropes connecting the receiver loop frame to a hub member extending along a vertical axis of the receiver loop, wherein the two sets of ropes are axially spaced on the hub and are located on the opposite sides of the receiver loop. However, the proposed system is complex and may not be easily applied to receivers of large dimensions, or scaled up to accommodate various different receiver configurations, and as a result may not effectively isolate torsional and rotational vibrations from the receiver coil assembly.

Thus, there remains a need for an airborne EM system that provides increased signal-to-noise ratio and the depth of exploration, and a need for a simple, effective and versatile receiver coil assembly and system that reduce EM system noise by attenuating or eliminating unwanted motion or vibration in the receiver coil(s).

SUMMARY OF THE INVENTION

The present invention provides an airborne electromagnetic receiver coil assembly with a large dimension to allow low transmitter base frequency, thereby increasing the depth of geological exploration.

The present invention improves the overall reception sensitivity and reduces the system operation noises of an airborne EM system by providing a large dimension receiver coil assembly having a simple, effective and flexible vibration reduction mechanism.

The present invention reduces airborne EM system noise by attenuating or eliminating unwanted motion or vibration in the receiver coils.

The present invention isolates the receiver coil assembly from the erratic vibrations of the EM receiver frame in the geomagnetic field.

The present invention reduces erratic motion of the receiver in the geomagnetic field to a well-defined sinusoidal rocking motion of the receiver coil assembly, thereby creating a predictable signal that can be separated from the earth response and increasing the signal to noise ratios.

The present invention provides a stabilizer or suspension assembly for use within a structure supporting airborne EM equipment to stabilize or suspend the structure, thereby optimizing the vibration isolation performance of the structure.

The improved airborne EM system of the present invention allows the use of a lower transmitter base frequency, for example, 15 Hz or less, compared to that of the existing prior art systems.

This lower frequency increases the depth of exploration and provides increased system to noise ratios and allows for:
1. Large dipole moments;
2. Increased depth of exploration; and
3. Improved conductor discrimination.

In accordance with one aspect of the present invention, there is provided a receiver coil assembly for an airborne electromagnetic surveying system, comprising:
one or more receiver coils;
a receiver support structure supporting the one or more receiver coils; and
a suspension assembly disposed substantially within the receiver support structure, further comprising:
a support having a suspension portion substantially located at the centre of gravity of the suspension assembly; and
a plurality of links extended between a plurality of locations on the suspension portion and a plurality of locations on the receiver support structure;
wherein the plurality of links are adjustable in length and tension to radially suspend the receiver support structure thereby reducing movement or vibration of the receiver support structure.

Other features and advantages of the present invention will become apparent from the following detailed description and the accompanying drawings, which illustrate, by way of example, the principles of the invention.

BRIEF DESCRIPTION OF THE DRAWINGS

The invention will now be described by way of reference to the drawings, in which.

DETAILED DESCRIPTION OF THE INVENTION

The operation of an airborne EM system may introduce vibrations in the towed equipment. For example, downwash created by the aerodynamic action of a wing or helicopter rotor blade in motion may cause various undesirable vibrations, including rotational and torsional vibrations, in the equipment, such as an EM receiver, towed below an aircraft or helicopter.

In addition, erratic movement of the EM system receiver coil and or its assembly may result in unwanted vibrations which produce noise in EM measurements. Other sources of vibrations may include acoustic, solid and electromagnetic sources of excitation.

The present description provides an airborne EM system having a large receiver coil assembly with a simple, effective and flexible vibration dampening mechanism.

The EM system described herein provides various receiver platforms that are constructed to resist flex when rotational or torsional forces are applied. The receiver coil assembly can be affixed to the receiver platform using a suspension assembly based on a modified Roberts linkage type of structure. Roberts linkage is known as a structure that achieves near straight-line motion from rigid links and pivots and as such provides means to simulate the motion of a long radius pendulum in a relatively short height.

The suspension design substantially converts high frequency vibration forces imparted on the receiver coil and/or its assembly to a low frequency oscillation, thereby isolating the receiver coil and/or its assembly from rotational and/or translational vibration forces.

Figure 1:
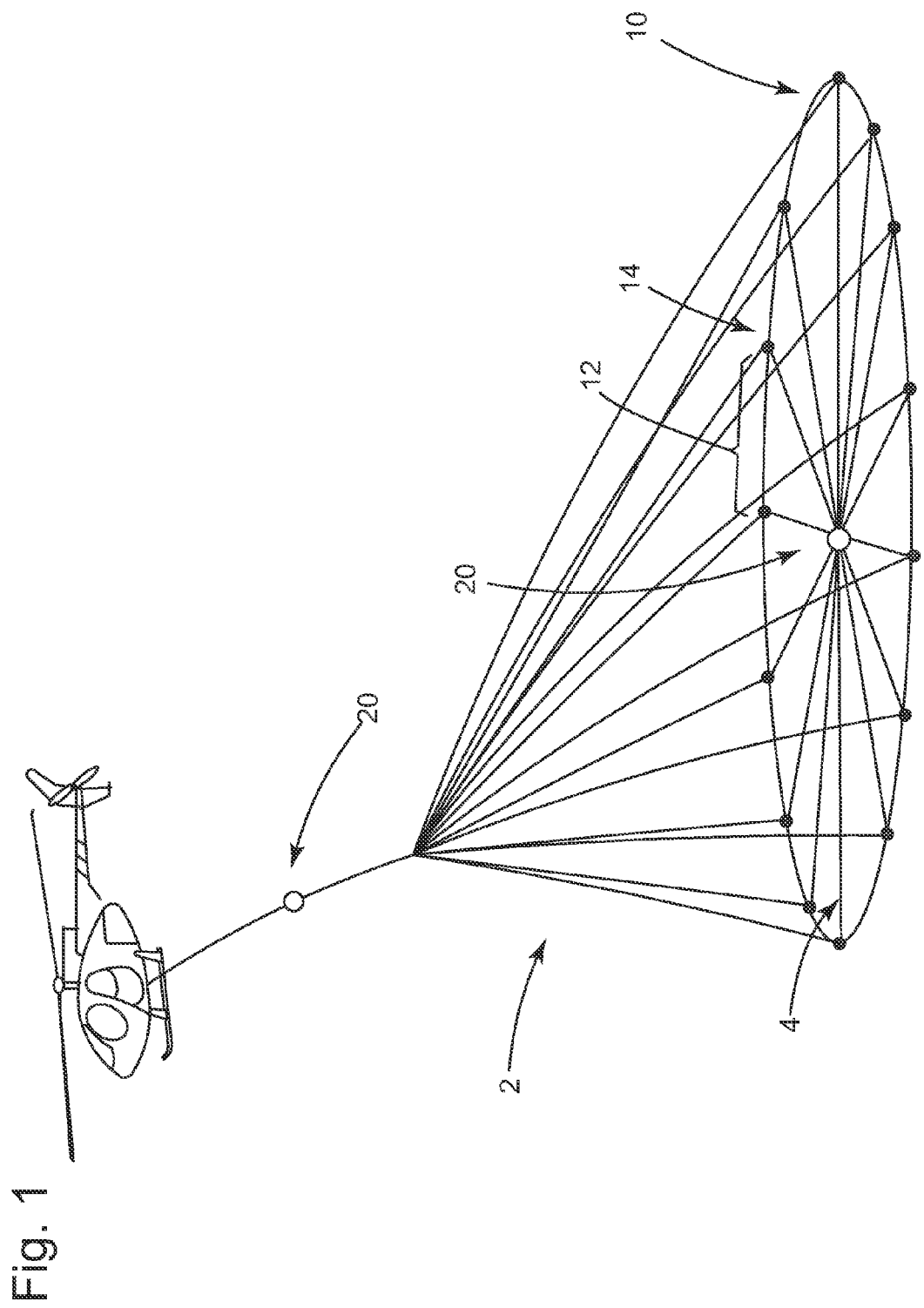
FIG. 1 is a schematic perspective view of an illustrative embodiment of the airborne EM system in an airborne position flying at surveying speeds.

Referring to FIG. 1, an aircraft towed EM survey system in accordance with some embodiments of the present disclosure generally comprises a tow assembly 2 comprising a transmitter section 10 and a receiver section 20. The receiver section 20 can be above, below, or within the transmitter section 10. The aircraft can be manned or unmanned power driven fixed-wing aeroplane, helicopter, airship or any other flying structure.

The transmitter section 10 may comprise a transmitter frame, in a circular or polygonal shape, which supports a transmitter coil for generating a primary electromagnetic field that induces a secondary electromagnetic field in the ground.

In one embodiment, the transmitter frame comprises tubular sections 12 that are serially connected at a plurality of joints 14 as shown in FIG. 1. A person skilled in the art, however, would appreciate that the systems disclosed herein may work with any type of transmitter.

In one embodiment, transmitter frame tubular section 12 is made of generally rigid material, which allows its size to be increased while maintaining the overall stability and structural integrity of the system. For example, materials such as carbon fiber reinforced plastic, carbon fiber reinforced polymer, unplasticized polyvinyl chloride (uPVC), wood/plastic composite, or any other composite or materials that provide strong rigidity, stability and resistance to deformation, can be used to construct tubular section 12 or portions thereof.

In one embodiment, lightweight materials are used for constructing tubular section 12 or transmitter section 10 to allow the construction of sizable transmitter frame without significantly increasing the weight thereof.

In one embodiment, in order to provide a generally rigid transmitter section 10, the tubular section 12 are connected in a manner that substantially eliminates the relative rotation between the connected tubular section 12, thereby allowing the transmitter frame to retain a rigid shape during operation, preventing distortion of the shape of the transmitter section 10.

As illustrative examples, for some embodiments, to enhance the rigidity of tubular sections 12 or transmitter section 10, fastening means are applied at the connecting locations or joints 14 to rigidly secure the connected tubular frame sections 12. Using fastening means ensures a rigid coupling between frame sections 12, thus minimizing joint rotation or movement during take-off, landing, or survey operation. For example, clamps and/or screws can be used to substantially eliminate or minimize relative movements between the frame sections 12.

The modular tubular section 12 described herein therefore provides stable support for transmitter section 10 and will, in the preferred embodiments, maintain the rigidity and stability of the transmitter section, other than its natural mechanical flex which may be caused by weight, as the size of the transmitter section increases. As the fastening means are used only at a limited number of locations around the joints 14 of the transmitter section 10, the added weight of the fastening means are negligible in practice.

When using a preferred embodiment of rigid transmitter frame described above, a transmitter section having diameter in excess of about 30 meters and weight of about 500 kg can be achieved. Therefore, the rigid transmitter section 10 significantly improves the signal to noise ratio and the mechanical agility of the tow assembly 2 of the airborne EM system.

Another advantage of the rigid transmitter section 10 is that the load bearing capability around the joints 14 can be enhanced by the fastening means. As such, it is now possible to support large receiver section 20 including large-dimension receiver coils or large receiver coil assemblies using the rigid transmitter section 10.

The receiver section 20 of the illustrative embodiment shown in FIG. 1 is positioned along a central axis that is substantially perpendicular to the plane defined by the transmitter frame, and is coupled to the transmitter section 10 by a plurality of cross support means 4 such as cross ropes or cross bars or rods.

The receiver section 20 may be disposed in a co-planar fashion with the transmitter section 10, or may be concentric or co-axial with the transmitter section 10. For example, the receiver section 20 may be positioned above or below the plane as defined by the transmitter section 10, within or at the center of the transmitter section 10, or offset from the center of the transmitter section 10.

According to the present disclosure, it has been found that large dimension receivers have shown a surprisingly high level of performance during in-flight testing, allowing the use of a low transmitter base frequency, for example, at 15 Hz or less, instead of the 25 Hz normally used. This lower frequency increases depth of exploration and signal to noise ratio.

Accordingly, in some embodiments of the airborne EM system described herein, the EM system may comprise a transmitter section 10 and a receiver section 20, the receiver section 20 having at least one receiver coil that has a dimension sufficiently large such that it is operable to measure response when a transmitter base frequency of less than 25 Hz is used. More preferably, the receiver coil has a dimension sufficiently large such that it is operable to measure a response when a transmitter base frequency of less than 15 Hz is used. Still more preferably, the receiver coil has a dimension sufficiently large such that it is operable to measure a response when a transmitter base frequency of less than 5 Hz is used.

Since larger receivers have unique natural frequencies and vibration isolation requirements, there is a need to optimize the large receiver design in order to reduce even more of the transmitter base frequency. For example, comparing with small receiver coil assemblies, large receiver coil assemblies tend to have more mass and complex mass distribution. As such, the natural frequencies of large receivers can be difficult to characterize, predict, or optimize. As a result, large receivers that allow a transmitter base frequency below 25 Hz have not been widely exploited by the airborne EM systems in the existing art.

The present disclosure provides a vibration reduction mechanism that can be applied to any receiver configuration including large receivers and therefore is not limited to receivers shown in the Figures of the present disclosure.

Figure 2:
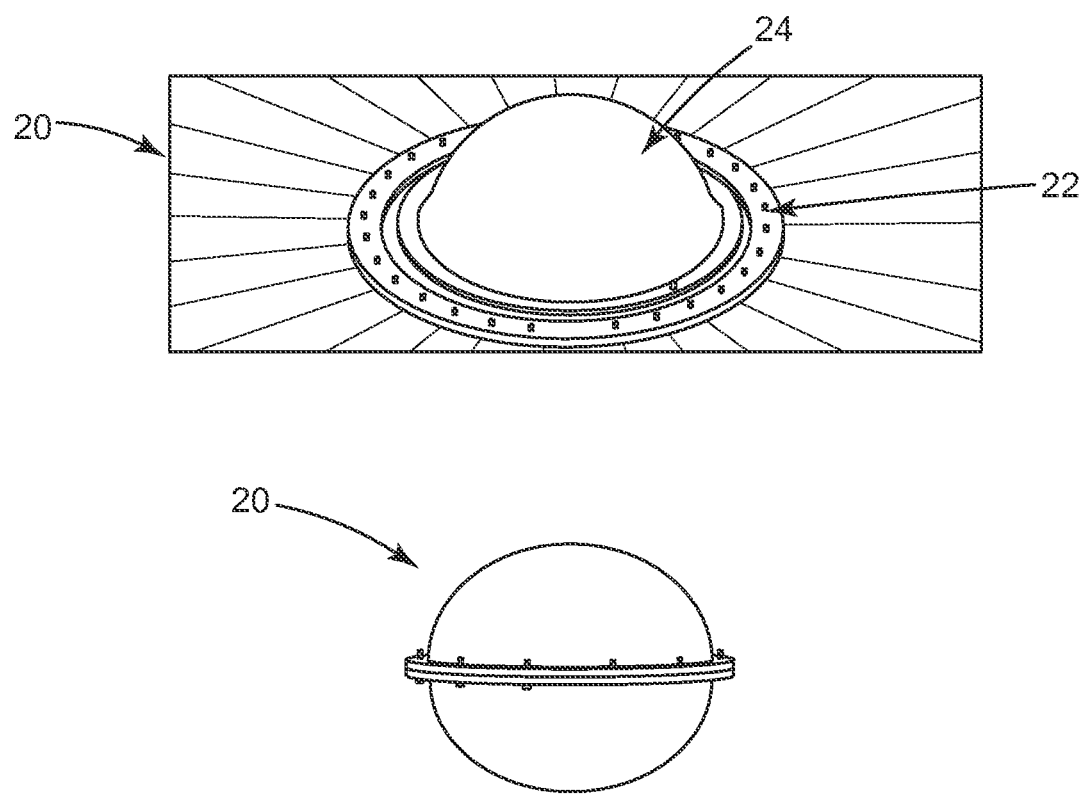
FIG. 2 illustrates perspective views of a receiver section according to illustrative embodiments of the airborne EM system.
Figure 3:
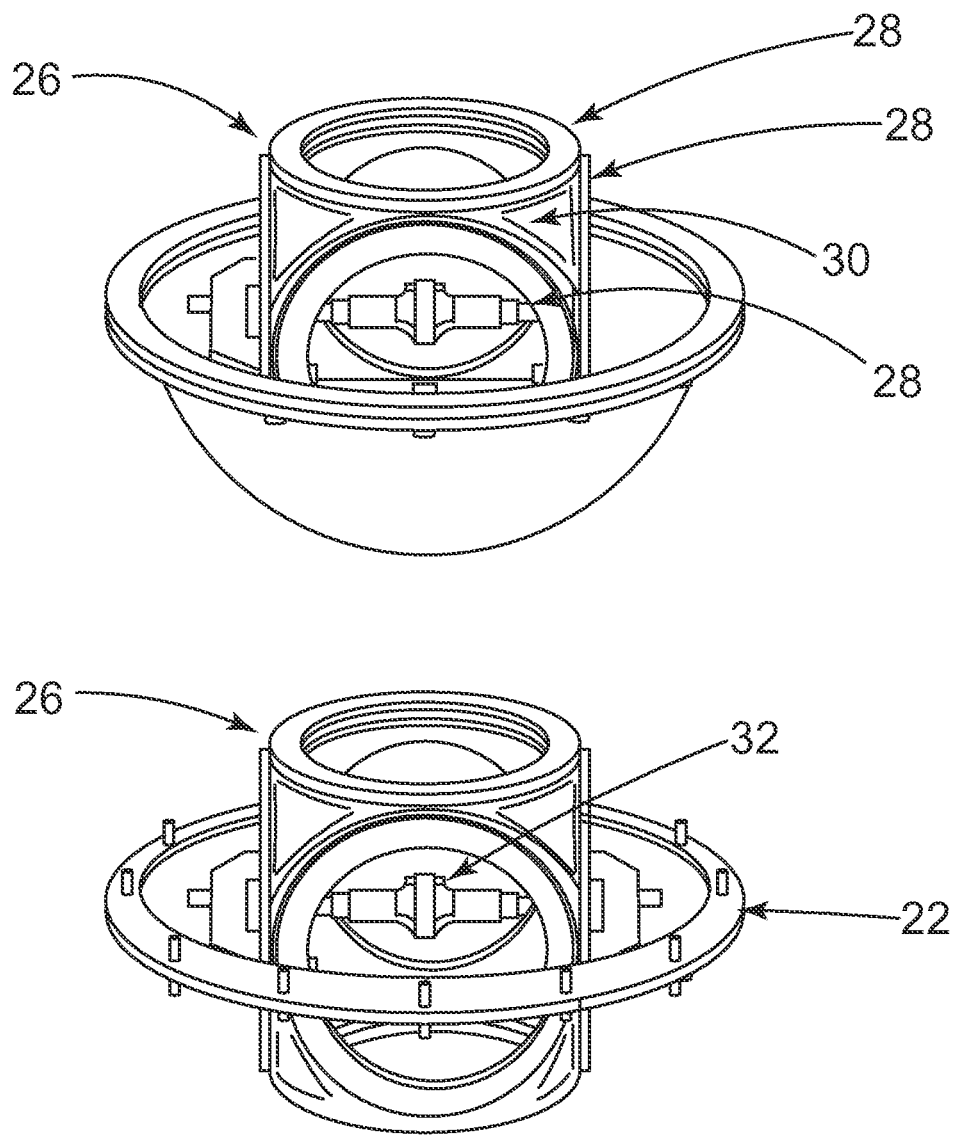
FIG. 3 illustrates partial exploded front views of a receiver section according to an illustrative example embodiment of the airborne EM system.

Referring to FIGS. 2 and 3, an illustrative embodiment of the receiver section 20 described herein may comprise a receiver frame 22 and one or more receiver coil assemblies 26. For ease of description, the illustrative embodiments of the present disclosure refer to one receiver coil assembly 26. However, a person skilled in the art would appreciate that the described principles can be applied to receiver section 20 of any size and configuration.

The receiver section 20 may include a receiver housing or shell 24 for enclosing the receiver coil assemblies. The receiver housing 24 is preferred as it provides environmental protection and stabilization to the receiver coils 28 and helps to isolate the receiver coil assembly 26 from external forces and noises. A person skilled in the art would appreciate that any suitable enclosure structures may be used.

In some illustrative embodiments, the receiver housing 24 can be a "bird" structure, which is an aerodynamic support structure that houses the EM receivers or sensors and other electronics. However, such a bird type enclosure structure is not necessarily required in all situations.

In some other illustrative embodiments where a receiver section 20 is used, as shown in FIG. 2, the receiver housing 24 is substantially a dome like, spherical structure comprising two semi-spherical portions that can be coupled to each other directly or indirectly, for example, by releasably mounting to the receiver frame 22, therefore allowing access to the inside of the receiver housing 24.

In some further illustrative embodiments, the receiver housing 24 can take any suitable form or configuration, and can be constructed or configured as a portion of the receiver frame 22. For example, to enhance aerodynamic stability, the receiver housing 24 may comprise ribs, grooves or stripes on its outer surface.

Given its spherical symmetry, a dome like housing 24 may provide enhanced stability for the enclosed receiver coil assembly. Namely, the spherical shell 24 is less likely to have the tendency to adjust its orientation or position when under external forces. In comparison, a bird type housing, which is less symmetrical and generally can be used to support small receiver coils that are about one-fourth (¼) of the large receiver coils described herein, is more likely to have the tendency to orientate or position itself in a particular manner to achieve stable equilibrium.

Preferably, the receiver housing 24 encloses the receiver coil assembly 26, by seal or other means, and may further comprise thermal insulation means such as multi-layer insulation, paints, and foams to help reduce noise and vibration as well as prevent moisture condensation during operation.

Preferably, the receiver frame 22 is constructed as an annular or ring-type plate disposed between the two semi-spherical shells 24. In some illustrative embodiments, the receiver frame 22 has an outer diameter that is larger than the outer diameter of the dome shell 24, and has a plurality of coupling means located along a circumference of the receiver frame 22, for connecting to respective position(s) along a circumference of the transmitter section 10 using cross support means 4. For example, the cross ropes 4 may link to the joints or elbows 14 of the transmitter section 10.

In some other illustrative embodiments of the EM system disclosed herein, the receiver section 20 may comprise multiple large receiver coil assemblies with different configurations.

Referring to FIG. 3, in some illustrative embodiments, the receiver coil assembly 26 is supported by the receiver frame 22, and may comprise at least one receiver coil 28, a generally rigid structure 30 for supporting the one or more receiver coils 28, and a suspension assembly 32 for stabilizing the receiver support structure 30.

In the present disclosure, the non-limiting term "receiver coil" refers to a broad range of means for sensing electromagnetic, magnetic, radiometric, gravity fields, including various wires, induction magnetometers, and any associated apparatus, electronics or circuitries for the proper functioning of the receiver coil.

While the receiver coil assembly 26 is intended to be deployed in a housing towed from an aircraft, a person skilled in the art would appreciate that such an assembly could be useful in all situations when vector component magnetic field data are acquired from any mobile vehicle since a static background field is always present. Such vehicles may include but are not limited to spacecraft, aircraft, ground and subterranean vehicles, marine and submarine vehicles, or any passive or active drone or platform towed from or attached to such a vehicle. The invention also applies to magnetic field sensors at a fixed location where rotational motion may otherwise be introduced by such effects as vibration, or where the magnetic field is to be measured on a moving part, such as on a piece of machinery.

Preferably, the receiver coil assembly 26, with the exception of receiver coils 28, is constructed using rigid, non-conductive, non-magnetic materials to avoid electromagnetic interference or coupling with the receiver coils 28.

Figure 4:
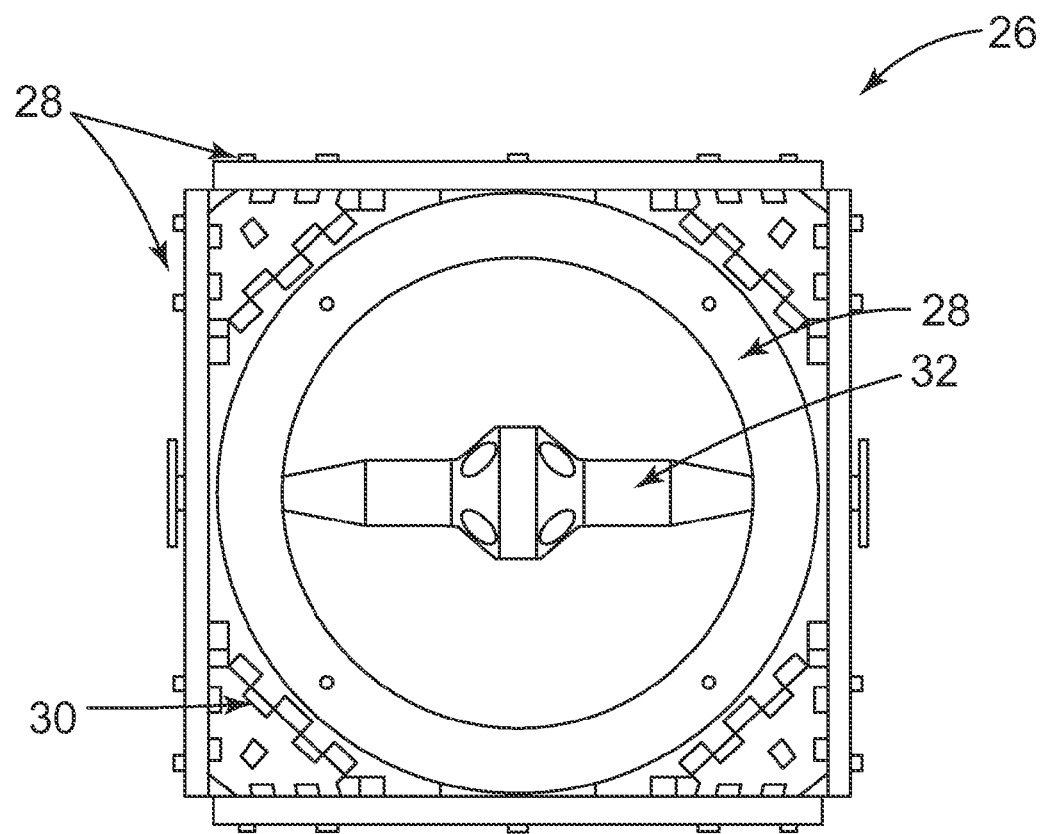
FIG. 4 is a partial perspective front view of a receiver coil assembly according to an illustrative embodiment of the airborne EM system.

Referring to FIGS. 3 and 4, and according to an illustrative embodiment of the airborne EM system described herein, the receiver support structure 30 may include hollow portions or apertures to reduce the weight of receiver support structure 30. Preferably, the receiver support structure 30 may be constructed using materials with good stiffness to weight ratio and/or strength to weight ratio. Such materials may include, for example, various species of wood, carbon-fiber-reinforced plastic, Kevlar™, and any other suitable composite or material. In some embodiments, however, semi-rigid or partially-flexible receiver support structure 30 can also be used.

The receiver support structure 30 may be constructed in various sizes and configurations to support various sizes of receiver coils 28 and various configurations thereof. Usually, the dimensions of the receiver support structure 30 closely approximate the dimensions of the receiver coils 28 for optimal structural and coil arrangements.

In some illustrative embodiments, as shown in FIG. 3, a receiver support structure 30 is used to support three mutually orthogonal pairs of receiver coils 28 that are substantially circular in shape. Each pair comprises two or more parallel receiver coils 28 spaced apart from each other. In this configuration, each of the six outer surfaces of the receiver support structure 30 supports a respective receiver coil 28. In one embodiment, the receiver support structure 30 can be a hollow, cube-like structure, although a person skilled in the art can appreciate any shape, configuration, or form of the structure may be used to achieve similar purpose. Preferably, at least some portions of each outer surface that do not directly support the receiver coil 28 can be removed or constructed as apertures. In other words, the cube-like structure 30 may have perforated portions that are devoid of material so that it is optimally configured to support the receiver coils 28.

Preferably, large receiver support structure 30 is used in accordance with some illustrative embodiments of the present disclosure to accommodate large sized receiver coils 28. Advantageously, receiver coils 28 with large diameters or dimensions have shown surprisingly high level of performance and signal sensitivity during in-flight testing.

For example, compared with commonly used prior art systems with smaller diameters of 0.16 m or 0.23 m receiver coil structures, a receiver coil 28 with a diameter of 0.7 m, which is at least more than four time of that of the smaller diameters, allows the effective use of a 15 Hz or less transmitter base frequency. In comparison, a typical prior art receiver coil 28 with a diameter of 0.23 m only allows the effective use of a 30 Hz transmitter base frequency. As shown in Table 1 below, the large diameter receiver coil structures provided much lower resonant frequency and motion induced noise compared to that of the prior art systems with smaller diameters.

TABLE 1

| Diameter of Receiver Coil Structure (meter) | Resonant Frequency of Motion (Hz) | Motion Induced Noise (nT/s) |
| --- | --- | --- |
| 0.16 | 0.61 | 1.50 |
| 0.23 | 0.54 | 0.80 |
| 0.70 | 0.24 | 0.30 |

As lower transmitter base frequency generally increases the depth of exploration of the EM system, using large receiver coils 28 generally improves the EM receiver performance by allowing the use of lower transmitter base frequency than the prior art systems.

Figure 5:
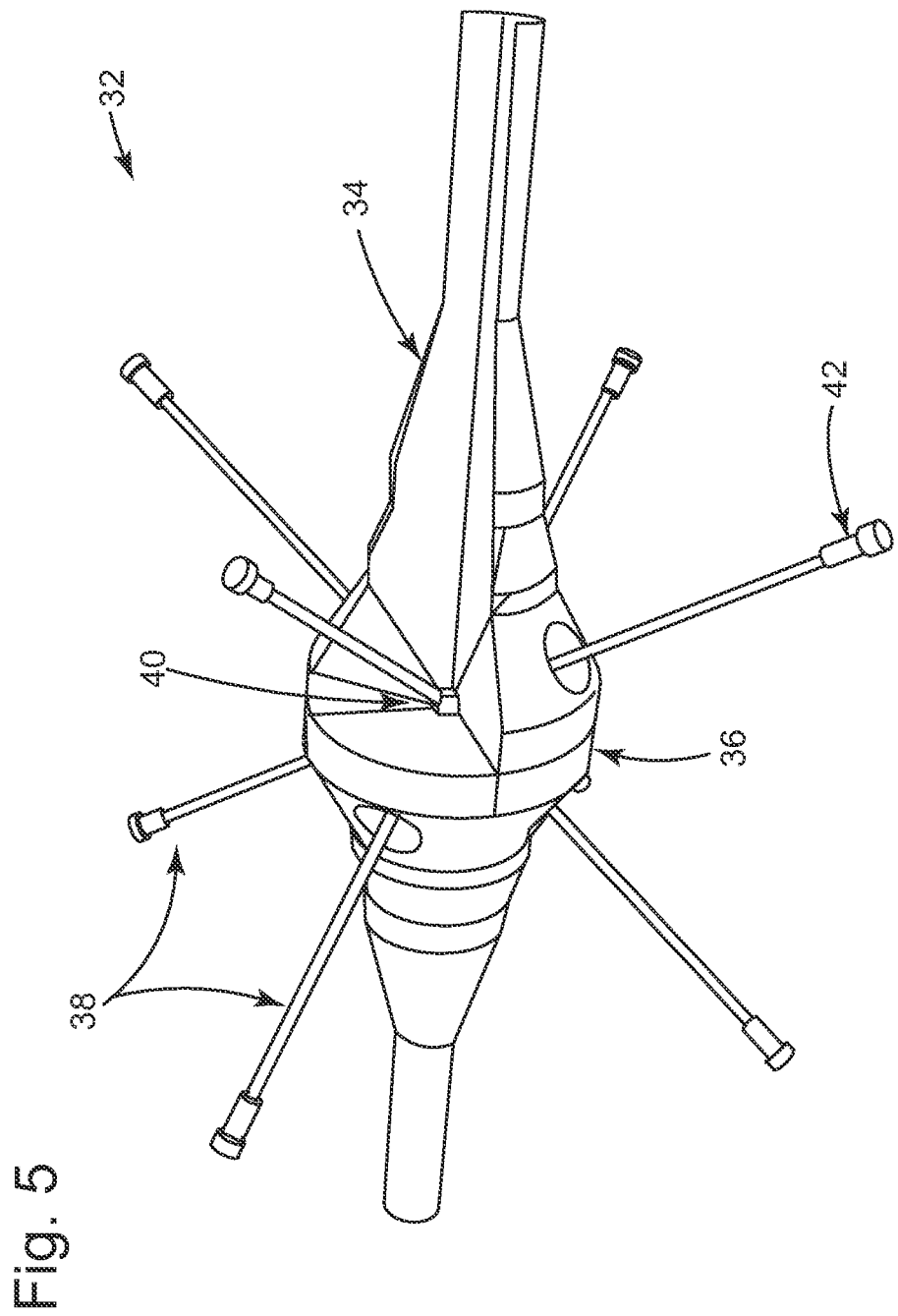
FIG. 5 is a perspective view of a suspension assembly according to an illustrative embodiment of the airborne EM system.

As shown in FIGS. 4 and 5 and in accordance with some illustrative embodiments of the present disclosure, a suspension assembly 32 based on a modified design of Roberts linkage is disposed substantially within the receiver support structure 30 for stabilizing or suspending said structure.

The suspension assembly 32 comprises a support 34 having a suspension portion 36. The suspension portion 36 may provide optimal attachment locations for non-elastic tension linkages between the suspension assembly 32 and the suspended support structure 30.

Preferably, to prevent distortion of the EM fields, the support 34 and the suspension portion 36 are constructed using non-metallic, non-conductive and non-magnetic materials. The support 34 and the suspension portion 36 can be constructed using the same materials, or materials with different characteristics in density, shape, strength and rigidity. Preferably, the support 34 and the suspension portion 36 are constructed from materials with high strength and stiffness and/or high density.

In some illustrative embodiments as described herein, the support 34 comprises an elongated member adapted to be used within the support structure 30. This helps to reduce the overall weight of the suspension assembly 32, and prevents the support 34 from being in contact with the support structure 30 when under disturbance, thus eliminating the static friction and mutual coupling between the support 34 and the support structure 30.

Preferably, the support 34 can be disposed in a manner that it passes through the centre of gravity of the support structure 30, particularly if the shape and weight distribution of the support structure 30 are symmetrical in at least one direction.

In some illustrative embodiments, the suspension portion 36 is substantially located at the centre of gravity of the suspension assembly 32. For example, when the support structure 30 or the suspension assembly 32 is uniformly constructed along at least one direction, it may be advantageous to substantially locate the suspension portion 36 at the centre of gravity of the suspension assembly 32.

Preferably, to facilitate the attachments of the linkages between the suspension assembly 32 and the suspended support structure 30, the suspension portion 36 may be constructed as a bulbous portion such that the suspension linkage attachment locations thereon are spaced apart from each other. Furthermore, the suspension portion 36 may include conical openings to substantially receive and guide the attached links 38 thereby preventing the links from rubbing or creating friction on the suspension assembly 32 during motion.

In some illustrative embodiments, the suspension assembly 32 can be modularly constructed. For example, the support 34 and the suspension portion 36 can be assembled together and disassembled from each other. For instance, the support 34 may comprise a plurality of serially coupled portions, wherein each portion may have identical or different characteristics such as dimension, shape, weight, density, strength or rigidity. This allows for easy and flexible adjustment of the location of the suspension portion 36. Such flexible tuning of the support 34 enables the suspension assembly 32 to be easily adapted for stabilizing or suspending a variety of support structures 30, particularly when the support structure 30 is of irregular shape or has non-uniform weight distribution.

As the mass distribution of the support 34 may affect the resonant frequency of the receiver coil assembly 26 motion, the modularity of the rigid support 34 also allows the adjustment or tuning of the resonant frequency of the receiver coil assembly 26 motion by adding, removing, and/or replacing portions of the support 34 to achieve optimal resonant frequency. This optimized resonant frequency may substantially minimize excitation from towed receiver section aerodynamic resonances and/or other sources of excitation. For example, if certain excitation frequencies are identified in the EM system or its operating environment, then the resonant frequency or natural frequency of the receiver coil assembly 26 motion can be modified to avoid coincidence with such excitation frequencies.

Referring to FIG. 5, the suspension assembly 32 further comprises a plurality of links 38, each link 38 having a first end 40 coupled to a respective location on the suspension portion 36 and a second end 42 operable to connect to a corresponding location on the support structures 30.

The links 38 are adjustable in tension and length. In a preferred embodiment, the links are non-elastic. As a result, when the second ends 42 of these links 38 are connected to the support structure 30 surrounding the suspension assembly 32, the suspension assembly 32 can radially suspend the support structure 30 under tension. As the suspension points 40 can be tuned to locate close to the center of gravity of the suspended support structure 30, the suspension assembly 32 may significantly reduce vibrations of structure 30 resulted from external forces.

Preferably, non-rigid links such as non-elastic ropes and non-elastic strings or wires can be used to reduce the weight of the suspension assembly 32.

As the length of each link 38 is adjustable or tunable, the suspension distance for the receiver coil assembly 26 relative to the suspension points 40 is also adjustable. Based on Roberts linkage modelling and analysis, the suspension distance will affect the resonant frequency of the receiver coil assembly 26 motion. As such, by adjusting the lengths of the links 38, the frequency responses of the receiver coil assembly 26 can be optimized.

Preferably, as shown in FIG. 5, the suspension links 38 are terminated on the suspension portion 36 as close as possible to the center of gravity of the support structure 30.

Figure 6:
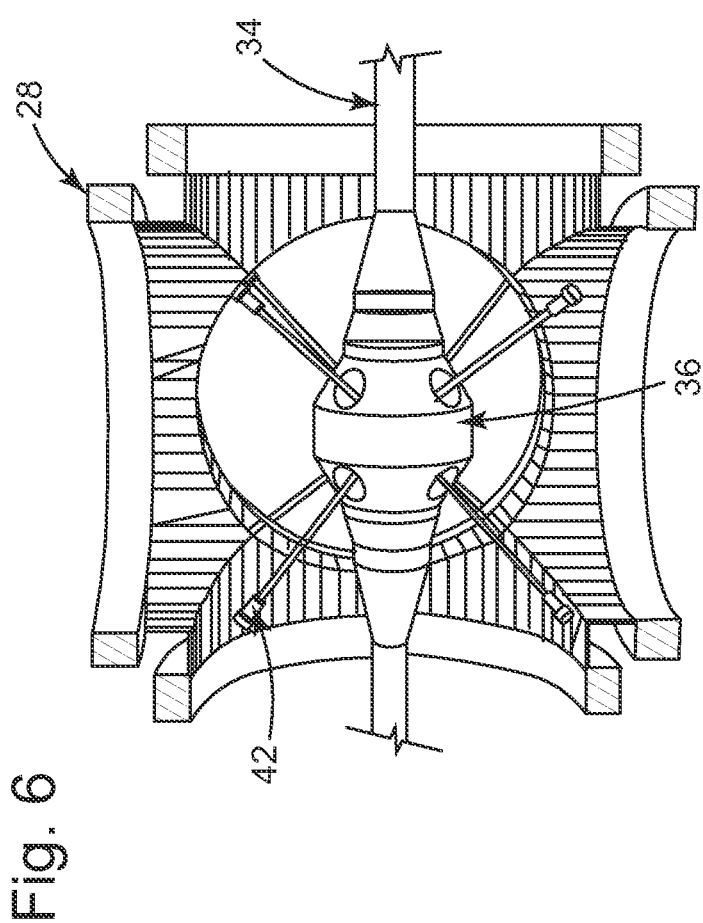
FIG. 6 illustrates a perspective cut-away view of a receiver coil assembly according to an illustrative embodiment of the airborne EM system.

For example, in FIGS. 5 and 6, the eight links 38 may attach to the suspension portion 36 at the vertices of a small virtual cube close to the center of gravity of the support structure 30. Correspondingly, the eight vertices of the small virtual cube are nominally aligned with the eight corners of the support structure 30, such that the second ends 42 of the eight links 38 are attached to the eight corners of the support structure 30.

Accordingly, the receiver coil array or coils 28 are supported by the suspension assembly 32 using positioning cords 38. The alignment and tension on these cords 38 allow for the correct orientation and positioning of the coils 28 with respect to the suspension axle of the suspension assembly 32.

Furthermore, the tension force in each link 38 can be adjusted. Advantageously, independent adjustment of link tensions allow tuning of the dynamic response of the suspension assembly 32 and the overall stiffness and rigidity of the receiver coil assembly 26 based on the Roberts linkage modeling, which is usually based on generally rigid suspension links.

The suspension assembly 32 thus can be tuned or adjusted according to the particular configuration of almost any receiver coil assembly. Based on the tunable parameters and characteristics of the suspension assembly 32, the resonant frequencies of the receiver coil assembly 26 can be adjusted based on modeling and/or experimenting. According to some illustrative embodiments of the present disclosure, the suspension assembly 32 can be tuned in such a way that the receiver coil assembly 26 oscillates at a substantially predictable low frequency when subject to high frequency vibration forces including rotational vibration forces and translational vibration forces.

Figure 7:
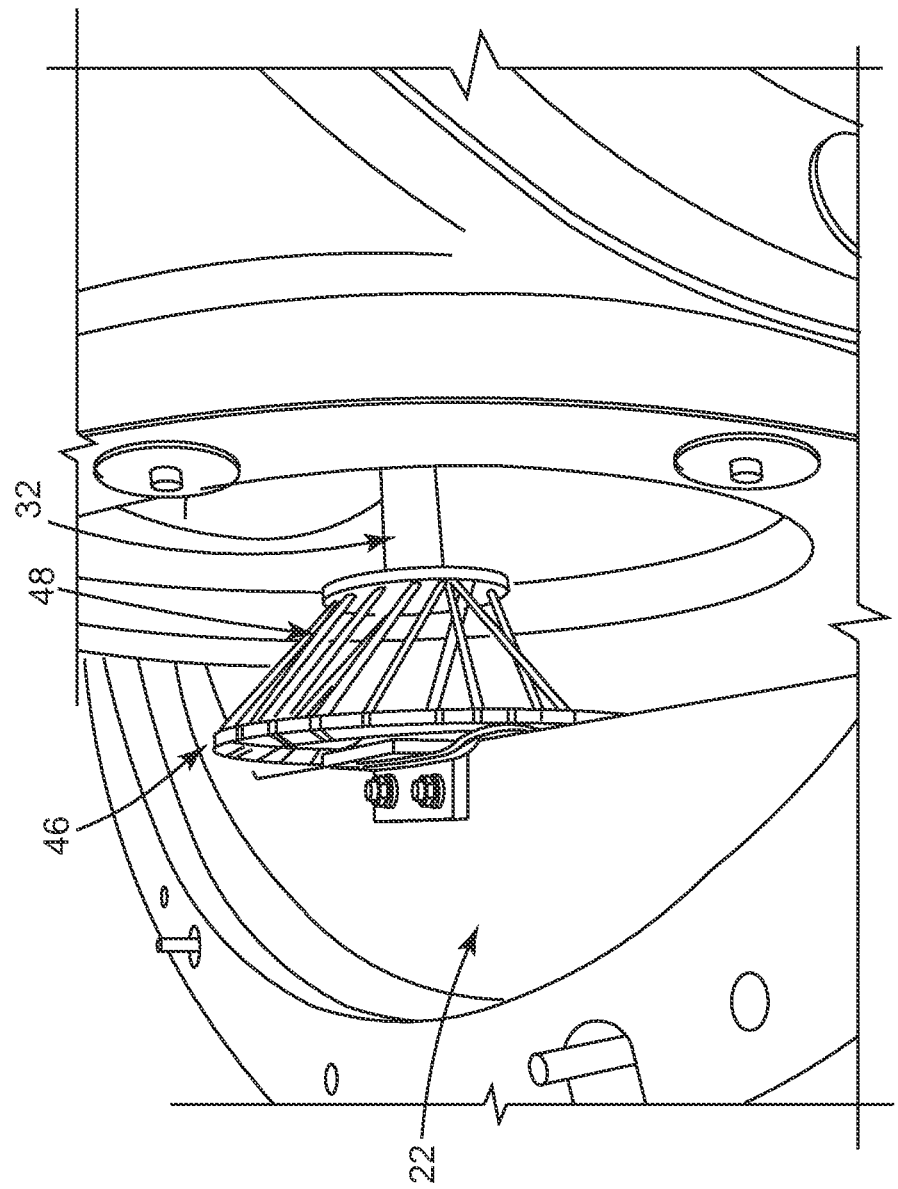
FIG. 7 is a partial perspective side view of a support for the suspension assembly according to an illustrative embodiment of the airborne EM system.

Referring to FIG. 7 and in accordance with some illustrative embodiments disclosed herein, the suspension assembly 32 is generally supported by the receiver frame 22 by various coupling means.

In some illustrative embodiments, the suspension assembly 32 is coupled to the receiver frame 22 using a suspension means comprising one or more braces 46 and elastomeric suspension means such as cords 48. For example, to suspend the two ends of the support 34, one brace 46 can be attached to the receiver frame 22 on each side of the support 34 using any suitable mechanisms known in the art. A plurality of elastomeric cords 48 can be used to connect the braces 46 and the ends of the support 34 in a manner which resists tension forces with respect to the length of the support 34, thereby allowing the suspension assembly 32 to maintain a leveled position.

In some illustrative embodiments, the combination of the braces 46 and the elastomeric cords 48 may be deployed between the receiver shell 24 and the suspension assembly 32 to help isolate the suspension assembly 32 from receiver shell vibrations. Similarly, such mechanism can be applied between the receiver shell 24 and the receiver coil assembly to help isolate vibrations.

Figure 8:
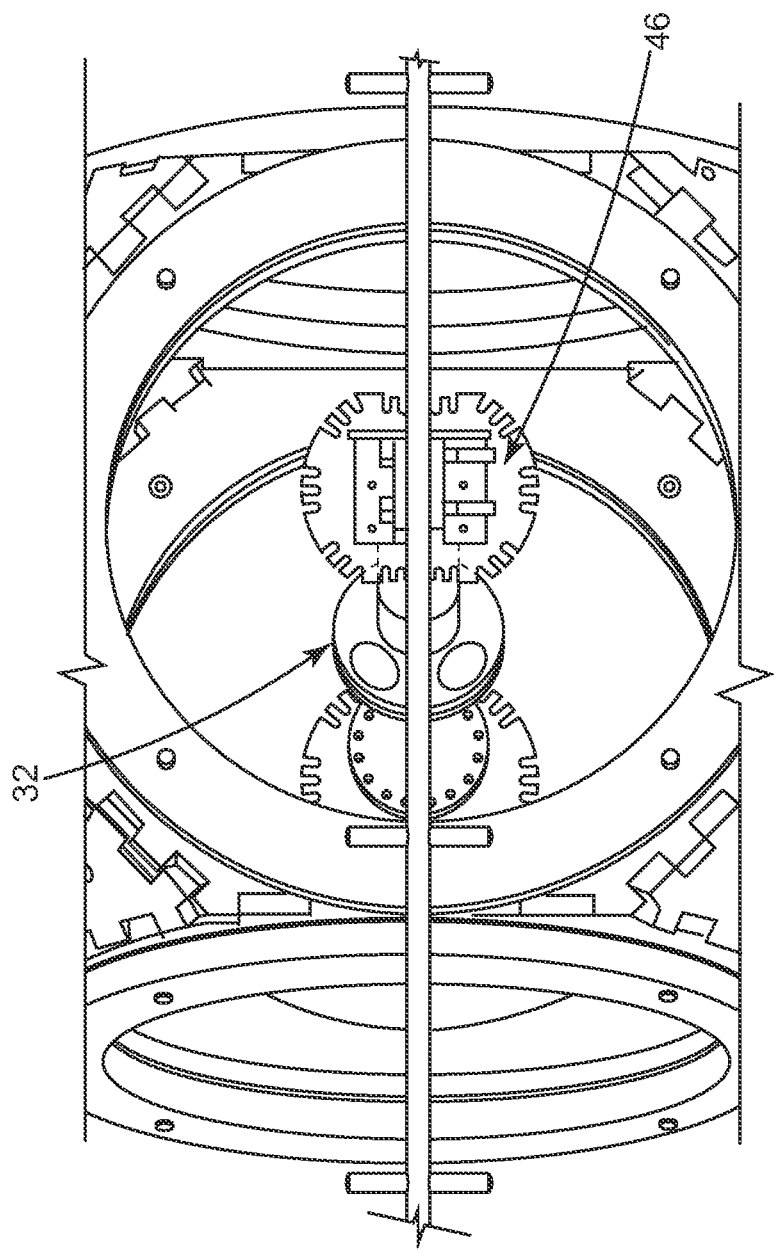
FIG. 8 is a partial perspective side view of a support for the suspension assembly according to an illustrative embodiment of the airborne EM system.

In some other illustrative embodiments, as shown in FIG. 8, at least some of the braces 46 and the ends of the suspension assembly 32 may comprise slots, apertures or other means for securing the cords 48 between the braces 46 and the ends of the suspension assembly 32. For example, such securing means allows the elastomeric cords 48 to be woven through the braces and the ends of the suspension assembly 32 thereby enhancing the frictional engagement therebetween.

While the support 34 is illustrated in the Figures of the present disclosure, it is to be understood that the suspension assembly 32 may include other elongated portions extending from the suspension portion 36 thereof. For example, the suspension assembly 32 may comprise more than one, for example, three mutually orthogonal supports 34 that can be suspended using the braces 46 and elastomeric cords 48 so that the suspension assembly 32 may resist torsional forces with respect to three orthogonal directions.

Figure 9:
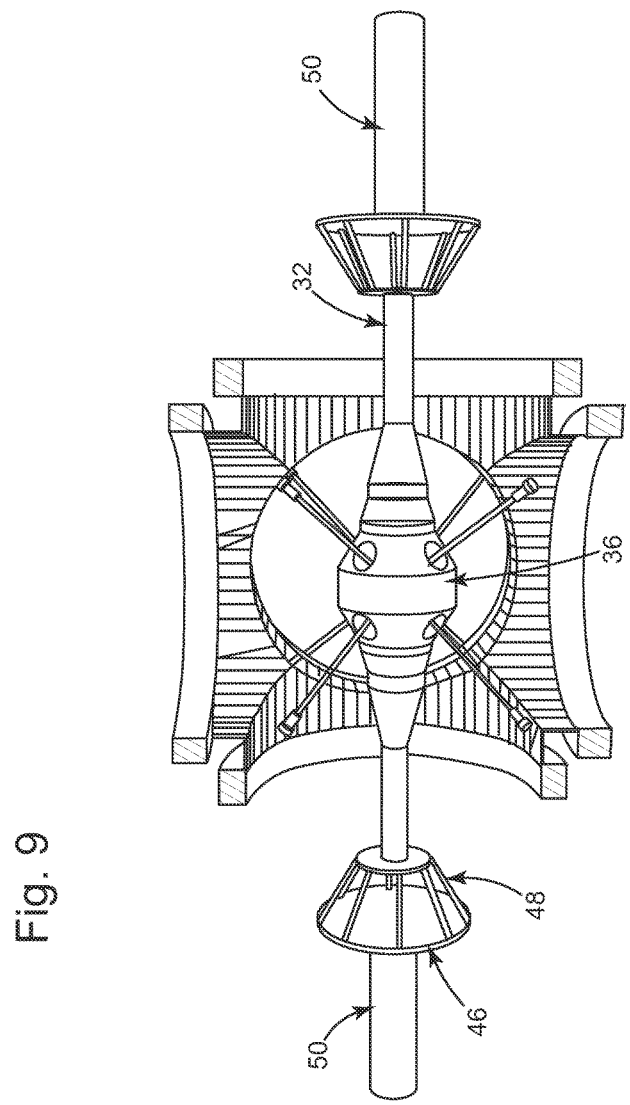
FIG. 9 is a perspective cut-away view of a receiver coil assembly according to an illustrative embodiment of the airborne EM system.

Referring to FIG. 9, in some example embodiments where a receiver bird (not shown) is used to support the receiver coil assembly 26, the receiver section may comprise a pivot post assembly for suspending the suspension assembly 32. For example, pivot post 50 may be coupled to the suspension assembly 32 at one end inside the bird shell 24 via the brace 46 and bungee cord 48, and may be coupled to a tow cable harness to the aircraft at the other end outside the bird shell 24.

The foregoing describes preferred embodiments of the invention and other features and embodiments of the invention will be evident to persons skilled in the art. Although the present invention has been described in considerable detail with reference to certain preferred embodiments thereof, other embodiments and modifications are possible. Therefore, the scope of the appended claims should not be limited by the preferred embodiments set forth in the examples, but should be given the broadest interpretation consistent with the description as a whole. The following claims are to be construed broadly with reference to the foregoing and are intended by the inventor to include other variations and sub-combinations that are not explicitly claimed.

What is claimed is:

1. A receiver coil assembly for an airborne electromagnetic surveying system, comprising:
   one or more receiver coils;
   a receiver support structure supporting the one or more receiver coils; and
   a suspension assembly disposed substantially within the receiver support structure, the suspension assembly further comprising:
   a support element extending through the receiver support structure and having a central suspension portion, wherein the central suspension portion is entirely located within the receiver support structure; and
   a plurality of links extended between a plurality of locations on the central suspension portion and a plurality of locations on the receiver support structure, wherein first ends of the plurality of links are attached to the central suspension portion at vertices that form a virtual cube.

2. A receiver section for an airborne electromagnetic surveying system, comprising:
   a receiver coil assembly;
   a receiver frame supporting the receiver coil assembly; and
   a receiver housing enclosing the receiver coil assembly, wherein the receiver coil assembly includes:
   one or more receiver coils,
   a receiver support structure supporting the one or more receiver coils, and
   a suspension assembly disposed substantially within the receiver support structure, further comprising:
   a support element extending through the receiver support structure and having a central suspension portion, wherein the central suspension portion is entirely located within the receiver support structure; and
   a plurality of links extended between a plurality of locations on the central suspension portion and a plurality of locations on the receiver support structure, wherein first ends of the plurality of links are attached to the central suspension portion at vertices that form a virtual cube.

3. A receiver coil assembly according to claim 1, wherein the one or more receiver coils has a diameter of more than 0.7 m.

4. An airborne electromagnetic survey system, comprising:
   a transmitter section; and
   a receiver section comprising at least one receiver coil, wherein said at least one receiver coil has a dimension that it is operable for measuring a response of an electromagnetic field when a low transmitter base frequency of less than 25 Hz is used,
   wherein the receiver section includes a receiver coil assembly comprising:
   the at least one receiver coil;
   a receiver support structure supporting the at least one receiver coil; and
   a suspension assembly disposed substantially within the receiver support structure, the suspension assembly further comprising:
   a support element extending through the receiver support structure and having a central suspension portion substantially located at a center of gravity of the suspension assembly, wherein the central suspension portion is entirely located within the receiver support structure; and
   a plurality of links extended between a plurality of locations on the central suspension portion and a plurality of locations on the receiver support structure, wherein first ends of the plurality of links are attached to the central suspension portion at vertices that form a virtual cube.

5. The airborne electromagnetic survey system according to claim 4, wherein the at least one receiver coil has a diameter of more than 0.7 m.

6. The receiver coil assembly of claim 1, wherein the plurality of links are adjustable in length and tension to radially suspend the receiver support structure thereby reducing movement or vibration of the receiver support structure.

7. The receiver coil assembly of claim 1, wherein the virtual cube is substantially located at a center of gravity of the receiver support structure.

8. The receiver coil assembly of claim 1, wherein the central suspension portion is substantially located at a center of gravity of the suspension assembly.

9. The receiver coil assembly of claim 1, wherein the support element is modular to adjust a resonant frequency of the receiver support structure.

10. The receiver coil assembly of claim 1, further comprising:
    posts connected to the support element through cords, wherein the cords allow the suspension assembly to maintain a leveled position.

11. The receiver coil assembly of claim 10, wherein the posts are located outside the receiver support structure.

12. The receiver section of claim 2, wherein the plurality of links are adjustable in length and tension to radially suspend the receiver support structure thereby reducing movement or vibration of the receiver support structure.

13. The receiver section of claim 2, wherein the virtual cube is substantially located at a center of gravity of the receiver support structure.

14. The receiver section of claim 2, wherein the suspension portion is substantially located at a center of gravity of the suspension assembly.

15. The receiver section of claim 2, wherein the support element is modular to adjust a resonant frequency of the receiver support structure.

16. The receiver section of claim 2, further comprising:
posts connected to the support element through cords, wherein the cords allow the suspension assembly to maintain a leveled position.

17. The system of claim 4, wherein the plurality of links are adjustable in length and tension to radially suspend the receiver support structure thereby reducing movement or vibration of the receiver support structure.

18. The system of claim 17, wherein the virtual is substantially located at a center of gravity of the receiver support structure, and wherein the support element is modular to adjust a resonant frequency of the receiver support structure.

* * * * *